(12) United States Patent
Misawa

(10) Patent No.: US 11,893,431 B2
(45) Date of Patent: Feb. 6, 2024

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Satoshi Misawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 386 days.

(21) Appl. No.: 17/163,536

(22) Filed: Jan. 31, 2021

(65) Prior Publication Data

US 2022/0083827 A1    Mar. 17, 2022

(30) Foreign Application Priority Data

Sep. 17, 2020   (JP) .................................. 2020-156326

(51) Int. Cl.
*G06K 15/00* (2006.01)
*G06K 15/02* (2006.01)

(52) U.S. Cl.
CPC ......... *G06K 15/408* (2013.01); *G06K 15/186* (2013.01); *G06K 15/1807* (2013.01); *G06K 15/1809* (2013.01); *G06K 15/1836* (2013.01)

(58) Field of Classification Search
None
See application file for complete search history.

(56) References Cited

U.S. PATENT DOCUMENTS

| | | | |
|---|---|---|---|
| 11,769,243 B2* | 9/2023 | Suzuki | H04N 1/00039 382/112 |
| 2009/0147280 A1* | 6/2009 | Yamaguchi | G06K 19/06009 358/1.9 |
| 2012/0321327 A1* | 12/2012 | Umeda | G03G 15/5062 399/15 |
| 2023/0114012 A1* | 4/2023 | Komazawa | H04N 1/00015 358/1.15 |

FOREIGN PATENT DOCUMENTS

JP    2017170841    9/2017

* cited by examiner

*Primary Examiner* — Dov Popovici
(74) *Attorney, Agent, or Firm* — JCIPRNET

(57) ABSTRACT

An information processing apparatus includes a processor configured to execute a rasterization process of forming image data recognizable by a printing apparatus on the basis of a print request and an inspection process of inspecting a print medium on the basis of inspection image data obtained by reading the print medium subjected to a printing process, and execute the inspection process with first inspection accuracy that is lower than highest inspection accuracy realizable by the processor in a case where the print request includes an instruction for plural-copy printing and does not include an instruction for variable printing.

18 Claims, 2 Drawing Sheets

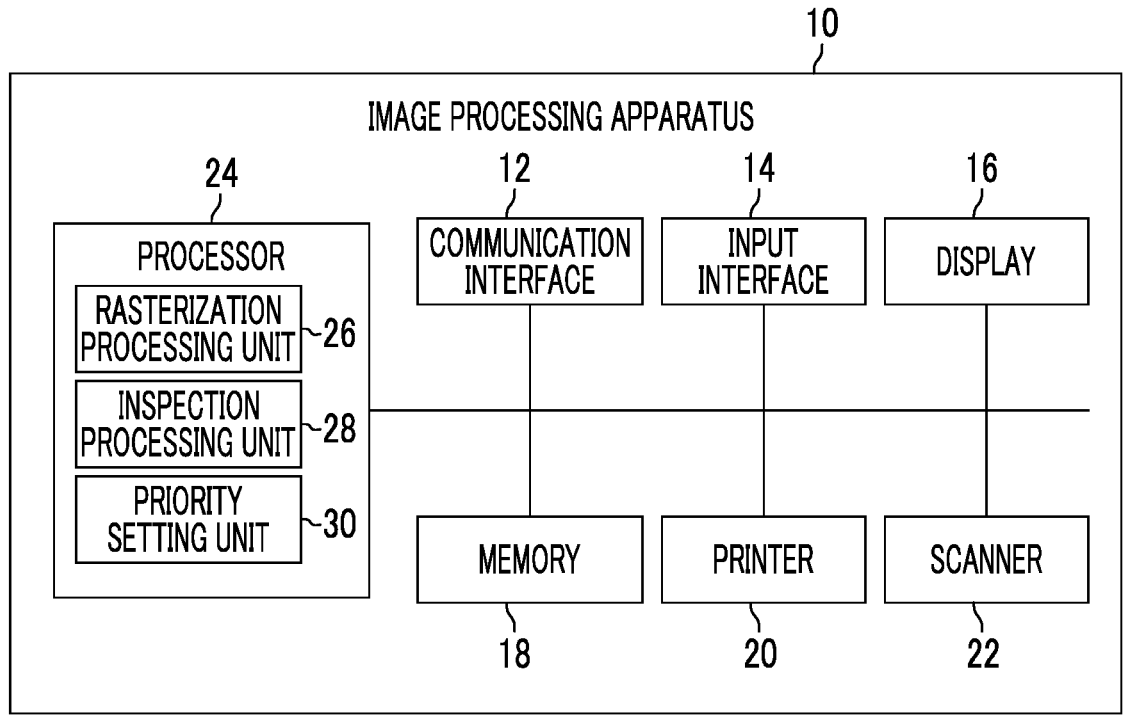

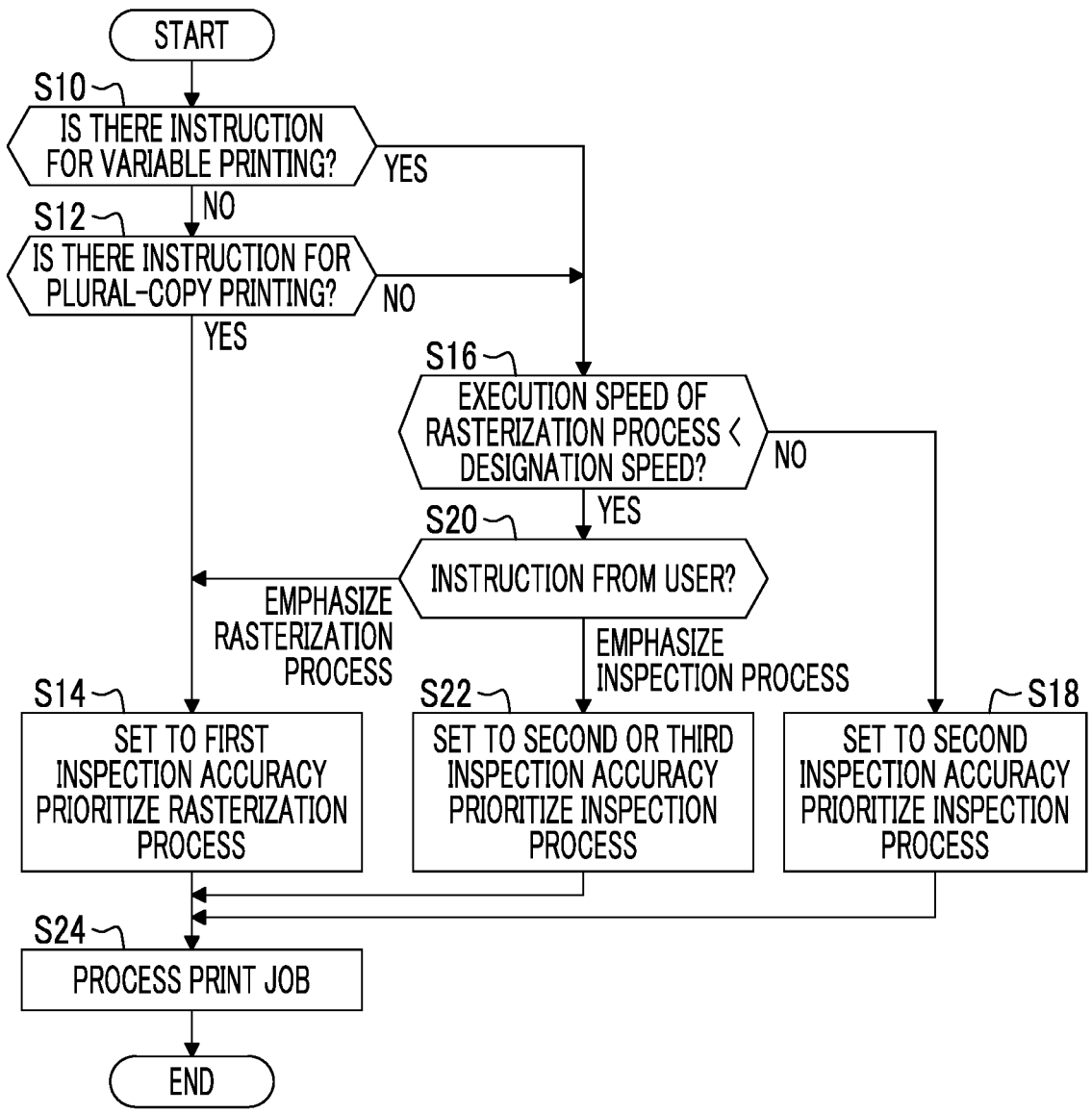

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2020-156326 filed Sep. 17, 2020.

BACKGROUND

(i) Technical Field

The present invention relates to an information processing apparatus and a non-transitory computer readable medium storing an information processing program.

(ii) Related Art

In the related art, a printed print medium is inspected by using image data obtained by optically reading the print medium that is printed by an image forming apparatus.

For example, JP2017-170841A discloses a technique in which an image forming apparatus includes an image reading inspection unit that performs defect inspection of a printed print medium by using read image data that is obtained by reading the printed print medium, and an abnormality detection unit that detects an abnormality (for example, a temperature or vibration of any part, or paper jam) in the image forming apparatus, and, in a case where the abnormality detection unit does not detect an abnormality, other control is prioritized to control for the image reading inspection unit, and in a case where the abnormality detection unit detects the abnormality, control for the image reading inspection unit is prioritized to other control.

SUMMARY

Meanwhile, there is an information processing apparatus that executes, with a single processor, a rasterization process of forming image data recognizable by a printing apparatus on the basis of a print request, and an inspection process of inspecting a print medium on the basis of inspection image data that is obtained by optically reading the print medium subjected to a printing process.

A print medium may be inspected more accurately by improving inspection accuracy in the inspection process. However, in a case where both of the rasterization process and the inspection process are executed with a single processor and the inspection accuracy in the inspection process is improved, a problem may occur in which a load of the inspection process increases and thus an execution speed of the rasterization process decreases. For example, there is a case where both the rasterization process at the highest execution speed that is realizable by the processor and the inspection process with the highest inspection accuracy that is realizable by the processor may be difficult to achieve. In a case where the inspection process is performed with the highest inspection accuracy at all times, an execution speed of the rasterization process will be lower than the highest execution speed depending on a load on the processor.

Aspects of non-limiting embodiments of the present disclosure relate to an information processing apparatus and a non-transitory computer readable medium storing an information processing program capable of improving an execution speed of a rasterization process according to characteristics of a print request in a processor that executes the rasterization process and an inspection process compared with a case where the inspection process is executed with the highest inspection accuracy at all times.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to execute a rasterization process of forming image data recognizable by a printing apparatus on the basis of a print request and an inspection process of inspecting a print medium on the basis of inspection image data obtained by reading the print medium subjected to a printing process, and execute the inspection process with first inspection accuracy that is lower than highest inspection accuracy realizable by the processor in a case where the print request includes an instruction for plural-copy printing and does not include an instruction for variable printing.

BRIEF DESCRIPTION OF THE DRAWINGS

Exemplary embodiment(s) of the present invention will be described in detail based on the following figures, wherein:

FIG. 1 is a schematic configuration diagram illustrating an image processing apparatus according to the present exemplary embodiment;

FIG. 2 is a diagram illustrating a relationship between characteristics of a print job and inspection accuracy of an inspection processing unit;

FIG. 3 is a diagram illustrating a relationship between characteristics of a print job and a prioritized process; and FIG. 4 is a flowchart illustrating a flow of processes in the image processing apparatus according to the present exemplary embodiment.

DETAILED DESCRIPTION

An information processing apparatus according to an exemplary embodiment of the invention has a single processor that performs a rasterization process of forming image data recognizable by a printing apparatus on the basis of a print job as a print request, and an inspection process of inspecting a print medium on the basis of inspection image data that is obtained by optically reading the print medium subjected to a printing process. In the present exemplary embodiment, a case where such an information processing apparatus is an image processing apparatus will be described. However, the information processing apparatus may be any apparatus as long as the information processing apparatus executes the rasterization process and the inspection process with a single processor. For example, the information processing apparatus may be an apparatus different from an image processing apparatus that performs a printing process and an image reading process, may transmit raster data obtained by performing a rasterization process on a print job to the image processing apparatus, and may perform an inspection process on the basis of inspection image data received from the image processing apparatus.

FIG. 1 is a schematic configuration diagram illustrating an image processing apparatus 10 as an information processing apparatus according to the present exemplary embodiment. The image processing apparatus 10 is a multi-function peripheral having a print function, a scan (image reading) function, a copy function, an image data transmission function, and the like.

A communication interface 12 is configured to include, for example, a network adapter and the like. The communication interface 12 has a function of communicating with another apparatus (for example, a user terminal used by a user) via a communication line such as a local area network (LAN). The communication interface 12 receives a print job as a print request from the user terminal.

The print job is data having setting information indicating print settings and print data that is a print target. For example, the print settings are set by the user, and the print data is selected by the user. The print data included in the print job is vector format data that cannot be recognized by a printer 20 as a printing apparatus described later. The vector format data is data in which contents of print data are expressed mathematically.

The print settings indicated in the setting information include setting values for various setting items. Particularly, in the present exemplary embodiment, the print settings include the presence or absence of an instruction for plural-copy printing. In a case where the plural-copy printing is set in the print settings, the print job having the setting information indicating the print settings is a print job including an instruction for plural-copy printing.

The plural-copy printing indicates a process of printing identical image data on plural copies (in other words, two or more copies) of print media (for example, paper). In a case where print target image data covers plural pages and an instruction for plural-copy printing is given, plural print medium sets having identical contents, formed of plural pages, are printed.

The print data may be, for example, document data or image data. The print data may include variable data. In a case where the print data includes the variable data, a print job having the print data is a print job including an instruction for variable printing.

The variable printing is to print document data or image data on plural print media, and further to print different data for each print medium. The different data for each print medium here is variable data. In a case where the print data includes the variable data, the print data includes document data or image data, the variable data, and information for designating a print position, a print size, and the like of the variable data in the document data or the image data.

Examples of the variable printing are not limited thereto, and include direct mails (DMs) to be sent to plural destinations. In this case, the document data or the image data is data indicating an advertisement content, and the variable data is data such as an address book indicating each destination. According to such a print job having print data including variable data, plural DMs on which different destinations are printed may be printed. In the variable printing, an identical image may be printed except for the variable data of each print medium after printing, but the variable data is different, and thus the variable printing and the plural-copy printing are different concepts.

An input interface 14 is configured to include, for example, a touch panel or buttons. The input interface 14 is used for the user to input various instructions to the image processing apparatus 10.

A display 16 is configured to include, for example, a liquid crystal panel. Various screens are displayed on the display 16. For example, the display 16 displays a screen for notifying the user of various pieces of information through processing in a notification processing unit 32 described later.

A memory 18 is configured to include, for example, a hard disk drive (HDD), a solid state drive (SSD), a read only memory (ROM), or a random access memory (RAM). The memory 18 may be provided separately from a processor 24 described later, or at least a part thereof may be provided in the processor 24. The memory 18 stores an information processing program for operating each constituent of the image processing apparatus 10.

The printer 20 as a printing apparatus is configured to include, for example, a charging device, a photoconductive drum, toner, and a print medium transport device. The printer 20 executes a printing process of forming (that is, printing) an image on a print medium on the basis of raster data formed by a processor 24 (particularly, a rasterization processing unit 26 described later).

A scanner 22 is configured to include, for example, a light source and a charge coupled device (CCD). The scanner 22 optically reads a print medium subjected to a printing process by the printer 20 to form inspection image data.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. As illustrated in FIG. 1, the processor 24 has functions as a rasterization processing unit 26, an inspection processing unit 28, and a priority setting unit 30 by executing an information processing program stored in the memory 18.

The rasterization processing unit 26 executes a rasterization process of forming raster format image data (in the present specification, the image data will be referred to as "raster data") that can be recognized by the printer 20 on the basis of vector format print data included in a print job. The "rasterization process" in the present specification is a concept including at least some of all processes performed to convert print data into raster data, such as a process of analyzing the print data, a process of converting the print data into intermediate data, a process of converting colors, and a process of converting the intermediate data into the raster format (for example, bitmap format) image data.

The raster data formed by the rasterization processing unit 26 is sent to the printer 20, and the printer 20 executes a printing process on the basis of the raster data. Consequently, an image corresponding to the print data and the raster data is printed on a print medium.

In a case where the printing process is completed by the printer 20, the inspection processing unit 28 causes the scanner 22 to optically read the print medium subjected to the printing process, and acquires inspection image data. Here, the inspection processing unit 28 may set a reading resolution of the scanner 22 in a case of reading the print medium subjected to the printing process.

The inspection processing unit 28 inspects the print medium subjected to the printing process on the basis of the inspection image data obtained by the scanner 22. In the present exemplary embodiment, the inspection processing unit 28 inspects the print medium subjected to the printing process by comparing the raster data generated by the rasterization processing unit 26 with the inspection image data. Specifically, the inspection processing unit 28 determines that the print medium is "good" in a case where the similarity between both of the pieces of data is equal to or more than a predetermined threshold value, and that the print medium is "defective" in a case where the similarity between both of the pieces of data is less than the predetermined threshold value. As an inspection method performed by the inspection processing unit 28, other methods may be used as long as the methods are performed on the basis of inspection image data.

The inspection accuracy of the inspection processing unit 28 varies depending on a reading resolution of the scanner 22 in a case of reading a print medium subjected to a printing process. That is, as the reading resolution of the scanner 22 becomes higher, the resolution of inspection image data becomes higher, and thus more accurate inspection between the raster data and the inspection image data becomes possible. That is, as the reading resolution of the scanner 22 becomes higher, the inspection accuracy of the inspection processing unit 28 becomes higher. On the contrary, as the reading resolution of the scanner 22 becomes lower, the inspection accuracy of the inspection processing unit 28 becomes lower.

On the other hand, as the reading resolution of the scanner 22 becomes higher, the data volume of the inspection image data is increased, and thus the processing amount in a comparison process between the raster data and the inspection image data in the inspection processing unit 28 is increased. That is, a load of the inspection process on the processor 24 is increased. On the contrary, as the reading resolution of the scanner 22 becomes lower, the data volume of the inspection image data is reduced, and thus the processing amount in the comparison process between the raster data and the inspection image data in the inspection processing unit 28 is reduced. That is, the load of the inspection process on the processor 24 is reduced.

As described above, since where the processor 24 executes both the rasterization process and the inspection process, and the processing performance of the processor 24 is finite, in a case where a load of the inspection process (in other words, the processing amount) becomes excessive, an execution speed of the rasterization process in the rasterization processing unit 26 may be reduced. A case is assumed in which at least the processor 24 in the present exemplary embodiment does not have the processing performance to achieve both the inspection process with the highest inspection accuracy that is realizable by the processor 24 and the rasterization process at the highest execution speed that is realizable by the processor 24.

In light of this fact, in the present exemplary embodiment, the inspection processing unit 28 changes the inspection accuracy in the inspection process according to characteristics of a print job. Here, the characteristics of the print job indicate contents of print settings of the print job and contents of print data that is a print target. More specifically, the characteristics include whether or not the print job includes an instruction for plural-copy printing, and whether or not the print job includes an instruction for variable printing. Whether or not the print job includes an instruction for plural-copy printing may be identified on the basis of setting information of the print job. Whether or not the print job includes an instruction for variable printing may be identified by analyzing print data (for example, whether or not the print data includes variable data).

Specifically, in a case where the print job includes an instruction for plural-copy printing and does not include an instruction for variable printing, the inspection processing unit 28 executes an inspection process with first inspection accuracy that is lower than the highest inspection accuracy that is realizable by the processor 24. In the present exemplary embodiment, the inspection processing unit 28 sets the reading resolution of the scanner 22 to a first resolution lower than the highest resolution that is realizable by the scanner 22 in order to execute the inspection process with the first inspection accuracy, and acquires inspection image data by causing the scanner 22 to optically read a print medium subjected to a printing process. The inspection processing unit 28 executes the inspection process by comparing raster data with the acquired inspection image data.

Consequently, a data volume of the inspection image data is smaller than in a case where the inspection image data is acquired through a reading process of the scanner 22 set to the highest resolution, and thus a load of the inspection process on the processor 24 may be reduced and a decrease in an execution speed of a rasterization process in the rasterization processing unit 26 may be suppressed.

In a case where a print job includes an instruction for plural-copy printing and does not include an instruction for variable printing, the reason why the inspection accuracy is lower than the highest inspection accuracy is as follows. In the inspection process, in a case where there is a printing error in a unique portion (that is, a portion different from other print media) in each print medium, detection of the print error is often more consequential. For example, in the example of the DM, detection of a printing error of a destination in each print medium is more consequential than a data portion indicating advertisement contents common to plural print media. In light of this fact, in a case where an instruction for the plural-copy printing is given and an instruction for the variable printing is not given, plural print media resulting from a printing process do not have unique portions, and image data with an identical content is printed. That is, in this case, the consequence of the inspection process is reduced (although there is no inconsequential process, of course) compared with a case where plural print media have unique portions. Therefore, in this case, the inspection accuracy of the inspection process may be reduced as long as the execution speed of the rasterization process is reduced.

In a case where the print job does not include an instruction for the plural-copy printing or includes an instruction for the variable printing, the inspection processing unit 28 executes the inspection process with second inspection accuracy that is higher than the first inspection accuracy. The second inspection accuracy may be, but is not limited to this, the highest inspection accuracy that is realizable by the processor 24. In the present exemplary embodiment, the inspection processing unit 28 sets the reading resolution of the scanner 22 to a second resolution (which may be the highest resolution that is realizable by the scanner 22) higher than a first resolution in order to execute the inspection process with the second inspection accuracy, and acquires inspection image data by causing the scanner 22 to optically read a print medium subjected to a printing process. The inspection processing unit 28 executes the inspection process by comparing raster data with the acquired inspection image data.

In a case where the print job does not include an instruction for plural-copy printing or includes an instruction for variable printing, different pieces of image data are printed on plural respective print media as a result of the printing process. This indicates that each print medium has a unique portion. Therefore, in this case, since the inspection process is more consequential, the inspection accuracy in the inspection process is made higher than at least the first inspection accuracy by executing the inspection process with the second inspection accuracy.

FIG. 2 illustrates a relationship between the characteristics of the print job and the inspection accuracy of the inspection processing unit 28. Ina case where the level of inspection accuracy in the first inspection accuracy, the second inspection accuracy, and the highest inspection accuracy is described again, the highest inspection accuracy, the second inspection accuracy, and the first inspection accuracy are described in descending order of the inspection accuracy. As described above, the second inspection accuracy may be the highest inspection accuracy.

In a case where the print job does not include an instruction for the plural-copy printing or includes an instruction for the variable printing, the inspection processing unit 28 originally performs inspection with the second inspection accuracy, but may execute the inspection process with the first inspection accuracy in a case where a user gives an instruction for emphasizing the rasterization process. The instruction for emphasizing the rasterization process from the user may be input according to any method. For example, the user may set the print settings of the print job to include emphasis of the rasterization process. The user may input the instruction via the input interface 14 separately from the print job. Alternatively, the user may set in advance emphasis of the rasterization process as a setting value of the image processing apparatus 10.

The user may input the instruction for emphasizing the rasterization process to the image processing apparatus 10, for example, in a case where the printing process is required to be completed urgently. According to this, even in a case where the print job does not include an instruction for the plural-copy printing or includes an instruction for the variable printing, the inspection processing unit 28 may execute the inspection process with the first inspection accuracy such that a decrease in the execution speed of the rasterization process in the rasterization processing unit 26 may be suppressed.

In a case where the print job does not include an instruction for the plural-copy printing or includes an instruction for the variable printing, and an execution speed of the rasterization process in the rasterization processing unit 26 in a case where the accuracy in the inspection process is set to the second inspection accuracy is lower than a designation speed, the inspection processing unit 28 may inquire the user as to whether or not the rasterization process is emphasized.

First, information (for example, a two-dimensional map) indicating a correspondence relationship between the inspection accuracy in the inspection process and an execution speed of the rasterization process according to processing performance (for example, the number of CPU clocks and the number of cores) of the processor 24 is stored in the memory 18 in advance to be prepared. Consequently, the inspection processing unit 28 may recognize the execution speed of the rasterization process in a case where the accuracy in the inspection process is the second inspection accuracy. As an index indicating the execution speed of the rasterization process, various indexes may be used, and, for example, an output data volume of raster data per unit time may be used.

The designation speed may be specifiable on the basis of, for example, user input. For example, the user inputs a print job, and also inputs a time limit that is a time required for a printing process related to the print job. The time limit may be set in advance as a setting value of the image processing apparatus 10. The inspection processing unit 28 may specify a designation speed in consideration of a data volume and a data content of print data of the input print job, the input time limit, and the time related to the printing process in the printer 20.

The inspection processing unit 28 determines whether an execution speed of the rasterization process in a case where the accuracy in the inspection process is the second inspection accuracy is lower than the specified designation speed. In a case where the execution speed is lower than the designation speed, the inspection processing unit 28 inquires the user as to whether or not the rasterization process is emphasized. A method of inquiring the user is not limited to this, and, for example, the following aspect may be considered in which a message such as "do you want to emphasize the rasterization process?" and "yes" and "no" buttons are displayed on the display 16. The inspection processing unit 28 may display a similar screen on a display of the user terminal.

In a case where the user gives an instruction for emphasizing the rasterization process in response to the inquiry, the inspection processing unit 28 performs the inspection process with the first inspection accuracy. On the other hand, in a case where the user does not give an instruction for emphasizing the rasterization process, in other words, the user gives an instruction for emphasizing the inspection process, the inspection processing unit 28 performs the inspection process with the second inspection accuracy.

In a case where the print job does not include an instruction for the plural-copy printing, or includes an instruction for the variable printing, and an execution speed of the rasterization process in the rasterization processing unit 26 in a case where the accuracy in the inspection process is set to the second inspection accuracy is lower than the designation speed, the inspection processing unit 28 may execute the inspection process with third inspection accuracy that is the highest inspection accuracy causing the execution speed of the rasterization process in the rasterization processing unit 26 to be equal to or higher than the designation speed.

The inspection processing unit 28 may specify the third inspection accuracy that is the highest inspection accuracy at which an execution speed of the rasterization process is equal to or higher than the designation speed on the basis of the above-described information indicating the correspondence relationship between the inspection accuracy in the inspection process and the execution speed of the rasterization process. The third inspection accuracy is higher than the first inspection accuracy and lower than the second inspection accuracy. In a case where the level of inspection accuracy in the first inspection accuracy, the second inspection accuracy, the third inspection accuracy, and the highest inspection accuracy is described, the highest inspection accuracy, the second inspection accuracy, the third inspection accuracy, and the first inspection accuracy are described in descending order of the inspection accuracy. The inspection accuracy in the inspection process is set to the third inspection accuracy, and thus the inspection process may be executed with the highest inspection accuracy as long as an execution speed of the rasterization process is maintained at the designation speed or higher.

In a case where the print job does not include an instruction for the plural-copy printing or includes an instruction for the variable printing, and an execution speed of the rasterization process in the rasterization processing unit 26 in a case where the accuracy in the inspection process is the second inspection accuracy is lower than the designation speed, the inspection processing unit 28 may inquire the user as to whether or not the rasterization process is emphasized, and then may execute the inspection process with the third inspection accuracy in a case where the user gives an instruction for not emphasizing the rasterization process, that is, gives an instruction for emphasizing the inspection process.

The priority setting unit 30 sets a processing priority of the rasterization process executed by the rasterization processing unit 26 and a processing priority of the inspection process executed by the inspection processing unit 28 in the processor 24.

In processes of the processor 24, the rasterization process and the inspection process may be regarded as the processes. The rasterization process and the inspection process that are processes are each configured with a thread group which is the finer processing unit. The processor 24 switches threads at predetermined time-slice times and sequentially performs processes. Consequently, a rasterization process thread and a inspection process thread are sequentially processed in a time-division manner, and thus the rasterization process and the inspection process may be executed as though the processes are executed at the same time.

The priority setting unit 30 assigns a processing priority to each thread. The processor 24 allocates a time-slice time to the thread having the highest processing priority among plural threads to perform a process. Each thread performs state transition between an active state and a suspended state (inexecutable state) depending on a process progress status. The processor 24 does not execute a process of a thread in the suspend state even in threads having the highest processing priority among the plural threads, and executes a thread having the highest processing priority among threads in the active state.

In a case where the print job includes an instruction for plural-copy printing and does not include an instruction for the variable printing, the priority setting unit 30 sets a processing priority of the rasterization process executed by the rasterization processing unit 26 to be higher than a processing priority of the inspection process executed by the inspection processing unit 28. More specifically, the priority setting unit 30 sets a processing priority of a rasterization process thread to be higher than a processing priority of an inspection process thread. As described above, in this case, since the inspection accuracy in the inspection process may be lowered (in other words, the rasterization process may be prioritized), a processing priority of the rasterization process is higher than a processing priority of the inspection process, and thus a rasterization process thread is preferentially executed. Therefore, an execution speed of the rasterization process may be improved compared with a case where the processing priority of the rasterization process is not higher than the processing priority of the inspection process.

In a case where the print job does not include an instruction for the plural-copy printing or includes an instruction for the variable printing, the priority setting unit 30 sets a processing priority of the inspection process executed by the inspection processing unit 28 to be higher than a processing priority of the rasterization process executed by the rasterization processing unit 26. More specifically, the priority setting unit 30 sets a processing priority of an inspection process thread to be higher than a processing priority of a rasterization process thread. As described above, in this case, since the inspection process is more consequential, a processing priority of the inspection process is higher than a processing priority of the rasterization process, and thus an inspection process thread is preferentially executed. Therefore, an execution speed of the inspection process may be improved compared with a case where the processing priority of the inspection process is not higher than the processing priority of the rasterization process.

FIG. 3 illustrates a relationship between characteristics of a print job and a prioritized process.

In a case where the print job does not include an instruction for the plural-copy printing or includes an instruction for the variable printing, the priority setting unit 30 originally sets a processing priority of the inspection process to be higher than a processing priority of the rasterization process, but may set the processing priority of the rasterization process executed by the rasterization processing unit 26 to be higher than the processing priority of the inspection process executed by the inspection processing unit 28 in a case where a user gives an instruction for emphasizing the rasterization process.

The outline of the image processing apparatus 10 according to the present exemplary embodiment is as described above. Hereinafter, a flow of the processes in the image processing apparatus 10 will be described with reference to a flowchart of FIG. 4.

In step S10, the inspection processing unit 28 analyzes print data of a print job input to the image processing apparatus 10 to determine whether or not the print job includes an instruction for variable printing. In a case where the print job does not include an instruction for the variable printing, the flow proceeds to step S12.

In step S12, the inspection processing unit 28 determines whether or not the print job includes an instruction for to plural-copy printing on the basis of setting information of the print job. In a case where the print job includes an instruction for the plural-copy printing, that is, in a case where the print job includes an instruction for the plural-copy printing and does not include an instruction for the variable printing, the flow proceeds to step S14.

In step S14, the inspection processing unit 28 sets the inspection accuracy in an inspection process to the first inspection accuracy. The priority setting unit 30 sets a processing priority of a rasterization process to be higher than a processing priority of the inspection process.

In a case where the print job is determined as including an instruction for the variable printing in step S10, or the print job is determined as not including an instruction for the plural-copy printing in step S12, the flow proceeds to step S16.

In step S16, the inspection processing unit 28 determines whether or not an execution speed of the rasterization process in a case where the inspection process is performed with the second inspection accuracy is lower than the designation speed. In a case where the execution speed of the rasterization process is equal to or higher than the designation speed, that is, the execution speed of the rasterization process is sufficiently maintainable even at the second inspection accuracy, the flow proceeds to step S18.

In step S18, the inspection processing unit 28 sets the inspection accuracy in the inspection process to the second inspection accuracy. The priority setting unit 30 sets a processing priority of the inspection process to be higher than the processing priority of the rasterization process.

In a case where the execution speed of the rasterization process is lower than the designation speed in step S16, the flow proceeds to step S20.

In step S20, the inspection processing unit 28 inquires a user as to whether or not the rasterization process is emphasized. In a case where the user gives an instruction for emphasizing the rasterization process in response to the inquiry, the flow proceeds to step S14. In a case where the user gives an instruction for emphasizing the inspection process in response to the inquiry, the flow proceeds to step S22.

In step S20, the inspection processing unit 28 sets the inspection accuracy in the inspection process to the second inspection accuracy or the third inspection accuracy. The priority setting unit 30 sets a processing priority of the inspection process to be higher than the processing priority of the rasterization process.

In a case where the inspection accuracy and the processing priority are set in any of steps S14, S18, or S22, the print job is processed in step S24. Specifically, the rasterization processing unit 26 executes the rasterization process according to the set processing priority, and the inspection processing unit 28 performs the inspection with the set inspection accuracy.

Although the exemplary embodiments according to the present invention have been described above, the present invention is not limited to the above exemplary embodiments, and various modifications can be made without departing from the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
execute a rasterization process of forming image data recognizable by a printing apparatus on the basis of a print request and an inspection process of inspecting a print medium on the basis of inspection image data obtained by reading the print medium subjected to a printing process; and
execute the inspection process with first inspection accuracy that is lower than highest inspection accuracy realizable by the processor in a case where the print request includes an instruction for plural-copy printing and does not include an instruction for variable printing.

2. The information processing apparatus according to claim 1, wherein
the processor is configured to, in a case where the print request includes an instruction for the plural-copy printing and does not include an instruction for the variable printing, set a processing priority of the rasterization process to be higher than a processing priority of the inspection process.

3. The information processing apparatus according to claim 1, wherein
the processor is configured to, in a case where the print request does not include an instruction for the plural-copy printing or includes an instruction for the variable printing, execute the inspection process with second inspection accuracy higher than the first inspection accuracy.

4. The information processing apparatus according to claim 2, wherein
the processor is configured to, in a case where the print request does not include an instruction for the plural-copy printing or includes an instruction for the variable printing, execute the inspection process with second inspection accuracy higher than the first inspection accuracy.

5. The information processing apparatus according to claim 3, wherein
the processor is configured to, in a case where the print request does not include an instruction for the plural-copy printing, or includes an instruction for the variable printing, set a processing priority of the inspection process to be higher than a processing priority of the rasterization process.

6. The information processing apparatus according to claim 4, wherein
the processor is configured to, in a case where the print request does not include an instruction for the plural-copy printing, or includes an instruction for the variable printing, set a processing priority of the inspection process to be higher than a processing priority of the rasterization process.

7. The information processing apparatus according to claim 3, wherein
the processor is configured to, even in a case where the print request does not include an instruction for the plural-copy printing or includes an instruction for the variable printing, execute the inspection process with the first inspection accuracy in a case where an instruction for emphasizing the rasterization process is received from a user.

8. The information processing apparatus according to claim 4, wherein
the processor is configured to, even in a case where the print request does not include an instruction for the plural-copy printing or includes an instruction for the variable printing, execute the inspection process with the first inspection accuracy in a case where an instruction for emphasizing the rasterization process is received from a user.

9. The information processing apparatus according to claim 5, wherein
the processor is configured to, even in a case where the print request does not include an instruction for the plural-copy printing or includes an instruction for the variable printing, set the processing priority of the rasterization process to be higher than the processing priority of the inspection process in a case where an instruction for emphasizing the rasterization process is received from a user.

10. The information processing apparatus according to claim 6, wherein
the processor is configured to, even in a case where the print request does not include an instruction for the plural-copy printing or includes an instruction for the variable printing, set the processing priority of the rasterization process to be higher than the processing priority of the inspection process in a case where an instruction for emphasizing the rasterization process is received from a user.

11. The information processing apparatus according to claim 7, wherein the processor is configured to, in a case where the print request does not include an instruction for the plural-copy printing, or includes an instruction for the variable printing, and an execution speed of the rasterization process in a case where accuracy in the inspection process is the second inspection accuracy is lower than a designation speed, inquire the user as to whether or not the rasterization process is emphasized.

12. The information processing apparatus according to claim 8, wherein the processor is configured to, in a case where the print request does not include an instruction for the plural-copy printing, or includes an instruction for the variable printing, and an execution speed of the rasterization process in a case where accuracy in the inspection process is the second inspection accuracy is lower than a designation speed, inquire the user as to whether or not the rasterization process is emphasized.

13. The information processing apparatus according to claim 9, wherein the processor is configured to, in a case where the print request does not include an instruction for the plural-copy printing, or includes an instruction for the variable printing, and an execution speed of the rasterization process in a case where accuracy in the inspection process is the second inspection accuracy is lower than a designation speed, inquire the user as to whether or not the rasterization process is emphasized.

14. The information processing apparatus according to claim 10, wherein the processor is configured to, in a case where the print request does not include an instruction for the plural-copy printing, or includes an instruction for the variable printing, and an execution speed of the rasterization process in a case where accuracy in the inspection process is the second inspection accuracy is lower than a designation speed, inquire the user as to whether or not the rasterization process is emphasized.

15. The information processing apparatus according to claim 3, wherein the processor is configured to, in a case where the print request does not include an instruction for the plural-copy printing, or includes an instruction for the variable printing, and an execution speed of the rasterization process in a case where accuracy in the inspection process is the second inspection accuracy is lower than a designation speed, execute the inspection process with third inspection accuracy that is the highest inspection accuracy causing the execution speed of the rasterization process to be equal to or higher than the designation speed.

16. The information processing apparatus according to claim 4, wherein the processor is configured to, in a case where the print request does not include an instruction for the plural-copy printing, or includes an instruction for the variable printing, and an execution speed of the rasterization process in a case where accuracy in the inspection process is the second inspection accuracy is lower than a designation speed, execute the inspection process with third inspection accuracy that is the highest inspection accuracy causing the execution speed of the rasterization process to be equal to or higher than the designation speed.

17. A non-transitory computer readable medium storing an information processing program causing a computer to execute:

a rasterization process of forming image data recognizable by a printing apparatus on the basis of a print request and an inspection process of inspecting a print medium on the basis of inspection image data obtained by reading the print medium subjected to a printing process; and the inspection process with first inspection accuracy that is lower than highest inspection accuracy realizable by a processor in a case where the print request includes an instruction for plural-copy printing and does not include an instruction for variable printing.

18. An information processing apparatus comprising:

means for executing a rasterization process of forming image data recognizable by a printing apparatus on the basis of a print request and an inspection process of inspecting a print medium on the basis of inspection image data obtained by reading the print medium subjected to a printing process; and executing the inspection process with first inspection accuracy that is lower than highest inspection accuracy realizable by the means in a case where the print request includes an instruction for plural-copy printing and does not include an instruction for variable printing.

* * * * *